Aug. 7, 1951   J. S. MALSBARY   2,563,179
CIRCUIT REGULATING APPARATUS
Filed July 31, 1946

INVENTOR:
James S. Malsbary
BY E. E. Huffman
ATTORNEY.

Patented Aug. 7, 1951

2,563,179

UNITED STATES PATENT OFFICE 2,563,179

CIRCUIT REGULATING APPARATUS

James S. Malsbary, Glendale, Mo., assignor to Wagner Electric Corporation, St. Louis, Mo., a corporation of Delaware Application July 31, 1946, Serial No. 687,438

10 Claims. (Cl. 323—23)

My invention pertains to apparatus for automatically regulating the voltage applied to or the current flowing through, an electrical device operated from an alternating current source.

Among the objects of my invention are to provide control apparatus for the purpose indicated which will automatically cause the voltage or current to be maintained within a small percentage of desired value; will not be affected by change in frequency or wave shape of a voltage or current occurring in the load circuit; will draw only a minimum amount of energy from said circuit; and will not be responsive to transients of short duration.

Figure 1:
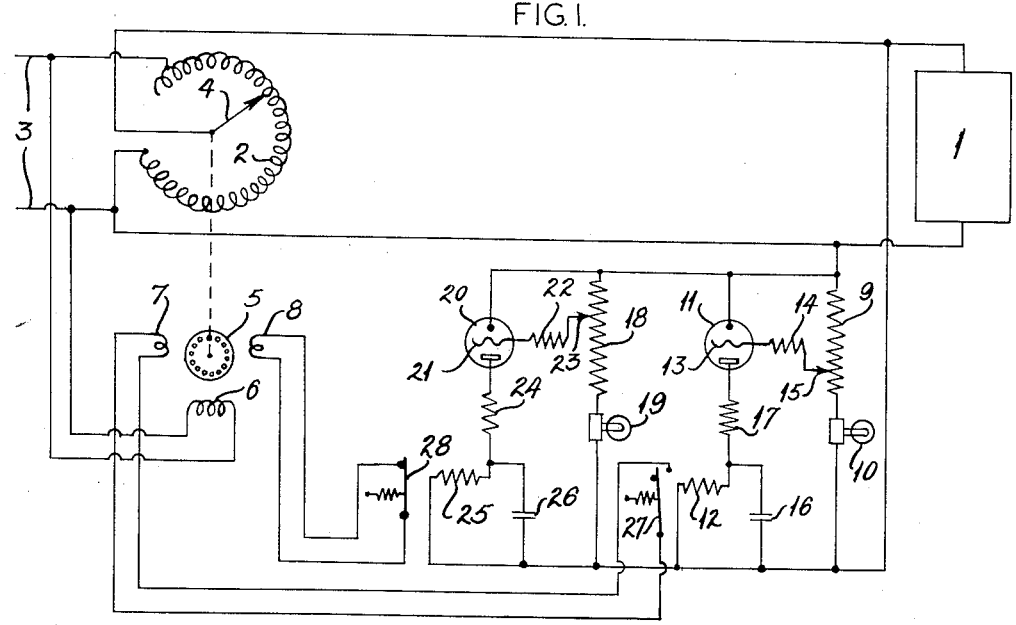
Figure 2:
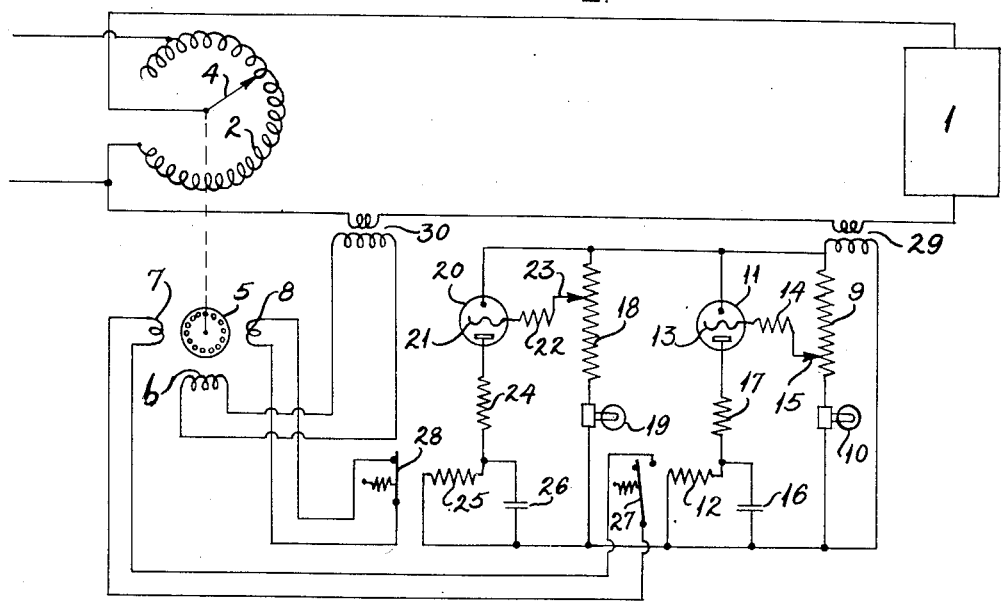

In the accompanying drawings, diagrammatically illustrating an embodiment of my invention, Figure 1 shows the control apparatus connected to be responsive to voltage variation in the load circuit, and Figure 2 shows the manner of connection under which the control apparatus responds to variation of current in that circuit.

Referring to Figure 1, the numeral 1 indicates an electrical device whose supply circuit is to be regulated. The supply circuit includes a variable voltage transformer 2 connected to alternating current supply mains 3. The voltage regulating contact arm 4 of the transformer is connected to be mechanically driven by the rotor 5 of an alternating current reversible type of shaded pole motor, this motor having an exciting winding 6 and shaded coils 7 and 8 each displaced from the exciting winding. The exciting winding is supplied from the alternating current power source and is therefore excited at all times during operation of the apparatus. During such operation the shading coils are both short-circuited throughout the continuance of application of a predetermined voltage to the electrical device 1, and the rotor 5 therefore normally remains stationary.

Referring now to the means for automatically varying the voltage impressed on the load circuit to restore it to the preselected value, an impedance 9 is connected in series with a non-linear impedance 10 and across the load circuit. This non-linear impedance may be what is commercially known as a "voltage regulator" tube or other apparatus having the characteristic that upon increase of voltage impressed on the circuit containing it, the voltage drop across its terminals does not increase, there being decrease in internal resistance and, therefore, increase in current through the device.

A cold cathode electron discharge tube 11 and a relay coil 12 (for controlling the circuit of shading coil 7) are connected across the load circuit in parallel with the impedance combination 9, 10, and the controlling grid 13 of the tube is connected through resistance 14 and by means of adjustable contact 15 to impedance 9. The tube 11 may pass current when its grid is positive with respect to the cathode to a predesigned potential value, but does not pass current when the grid voltage is negative. Due to the unidirectional action of the tube, current flows only during the half cycle when the plate is positive with respect to the cathode, and a capacity 16 is preferably connected across the coil 12 of the relay to prevent tendency of the relay armature to chatter. The resistance 17 serves to limit the current through the tube to a safe value and resistance 14 performs a like function as to the grid current.

Also connected across the load circuit is the series combination of impedance 18 and non-linear impedance 19, and with which is associated a second cold cathode tube 20 having a grid 21, a grid resistance 22, adjustable impedance contact 23, plate circuit resistance 24, relay coil 25, and associated capacity 26, all related and functioning in similar manner to like parts previously described in connection with the description of tube 11 and associated apparatus.

Relay coil 12 in circuit with tube 11 controls armature-switch 27 in circuit with shading coil 7 of the motor which operates the voltage adjusting switch arm of the transformer, and relay coil 25 controls armature-switch 28 in circuit with shading coil 8 of that motor.

Referring to the operation of the apparatus illustrated in Figure 1, the position of contact 15 cooperating with impedance 9 is so selected that when the voltage across the load circuit is at the desired value, the grid potential will have a value under which discharge from the cathode to the plate will occur, and the voltage regulating arm 4 of the transformer is initially so set that a voltage of at least that value will be applied to the load circuit. This will result in the relay coil 12 being energized and armature 27 brought to the position in which the shading coil 7 is short-circuited. The shading coil 8 is normally short-circuited by armature-switch 28, as indicated in the drawing.

Assuming that the original setting of contact arm 4 is such as to supply the desired voltage to the load, no operation will occur when the supply line is connected to the load other than the closing of armature-switch 27.

The adjustment of contact 23 cooperating with impedance 18 and controlling the voltage of the grid of tube 20 is such that under the desired normal voltage across the terminals of the load the potential of grid 21 will be insufficient to initiate discharge through tube 20, this setting being such, however, that under a predetermined amount of increase in the load circuit voltage above desired value the potential of grid 21 will be brought to a value which will initiate discharge through tube 20 with consequential energization of relay 25 and opening of armature-switch 28. The shading coil 8 being thus rendered inoperative and shading coil 7 being short-circuited, the armature 5 of the motor will rotate and so change the position of contact arm 4 of the variable transformer as to reduce the load circuit voltage to a value under which discharge through tube 20 ceases and spring controlling armature-switch 28 returns the switch to position short-circuiting shading coil 8 and thus stopping the rotation of the motor. Should the line voltage fall below the desired value the potential of grid 13 will be so reduced as to cause discontinuance of discharge through tube 11 and therefore deenergization of relay 12 and the consequent opening of the circuit of shading coil 7. The rotor will then operate in the opposite direction to that above mentioned until contact arm 4 of the variable transformer has been moved to a point to bring the load voltage back to a value resulting in resumption of discharge through tube 11 and, therefore, again short-circuiting shading coil 7 and stopping the operation of the motor.

The employment of non-linear impedances 10 and 19 in circuit with the ordinary impedances 9 and 18 greatly increase the sensitivity of the control. If we assume the characteristics of impedances 9 and 10 to be such that under a voltage of particular value "E" impressed on the series combination of these impedances the voltage drop across each of them will be $$\frac{E}{2}$$

it will be apparent that if impedance 10 has the characteristic that an increase in voltage "E" will not increase the voltage drop across its terminals, the increase in voltage drop across impedance 9 will be equal to the increase in voltage impressed on the combination. In other words, if the voltage increase is E' the drop across the terminals of impedance 9 will be $$\frac{E}{2}+E'$$

The ratio of final voltage across the series combination to the original voltage is then $$\frac{E+E'}{E}=1+\frac{E'}{E}$$

but the ratio of final voltage across impedance 9 to the original voltage is $$\frac{E/2+E'}{E/2}=1+2E'/E$$

Thus the percentage change of voltage across impedance 9 is twice the change across the series combination and since the operation of the control apparatus is based upon changes in voltage in the load circuit, the amount of change is magnified insofar as its effect upon the grid circuits of the tubes is concerned. Consequently the sensitivity of the control apparatus to voltage variation in the load circuit is increased and the variation maintained within narrow limits.

The arrangement set forth in Figure 1 regulates to maintain close approximation of a predetermined operating voltage in the load circuit but the control apparatus can also be employed to maintain constant current in the load circuit. In order to obtain this result it is only necessary to produce a voltage for application to the control circuits which increases and decreases with increasing or decreasing load circuit current. Such voltage can be obtained by means of an ordinary current transformer 29 in which the voltage developed across the secondary is proportional to the current flowing through the primary winding. The voltage for the control circuits is derived from this secondary as illustrated in Figure 2 where the same numerals have been applied to the control circuit parts as in Figure 1. The design of the transformer 29 will be such that the variation in current drawn from the secondary in the operation of the control apparatus will cause only negligible change in the output voltage of said winding.

As indicated in Figure 2, the exciting winding 6 of the reversible motor may be supplied from a transformer 30 in the load circuit in lieu of being supplied directly from the alternating current main, as illustrated in Figure 1.

Having fully described my invention, that which I claim as novel and desire to protect by Letters Patent of the United States is:

1. In apparatus for controlling the voltage impressed on the load circuit of an electrical device supplied from an alternating current source through a transformer provided with means for varying its transformation ratio, means for actuating said ratio varying means, and means for controlling said actuating means, said control means comprising a circuit including the cathode and plate elements of a gas filled three element electron discharge tube in series with a relay and connected across the load circuit and means rendering the grid circuit of said tube responsive to variation in an electrical condition in the load circuit, said last mentioned means including a linear and a non-linear impedance series connected across said load circuit with said grid connected to a point on said linear impedance intermediate its ends.

2. In apparatus for controlling the voltage impressed on the load circuit of an electrical device supplied from an alternating current source through a transformer provided with means for varying its transformation ratio, means for actuating said ratio varying means, and means for controlling said actuating means, said control means comprising a circuit including a relay and the cathode and plate elements of a three element electron discharge tube in a series and connected across said load; and means rendering the grid circuit of said tube responsive to variation in an electrical condition in the load circuit; said last mentioned means comprising a circuit embodying a non-linear impedance and a linear impedance connected across said load circuit, the grid circuit embodying a portion of said last mentioned impedance.

3. In apparatus for controlling voltage applied to an electrical device supplied from an alternating current source, a transformer provided with means for varying its transformation ratio and connected to said source, a reversible motor for actuating said ratio varying means, means constituting a control circuit for said motor and means responsive to voltage impressed by the transformer on the supply circuit of the electrical device for maintaining said control circuit closed, said last mentioned means comprising a relay and an electron discharge tube having a grid connected in series with each other and across the supply circuit of the electrical device, and a linear impedance and a non-linear impedance connected in series with each other and to the supply circuit in parallel with said tube and relay, the grid of the tube being connected to the linear impedance at a point intermediate the ends of the latter.

4. In apparatus for controlling voltage applied to an electrical device supplied from an alternating current source, a transformer provided with means for varying its transformation ratio and connected to said source, a reversible motor for actuating said ratio varying means, a first control circuit for said motor and means responsive to voltage impressed on the electrical device for maintaining said control circuit closed, said means comprising a relay and an electron discharge tube having a grid connected in series across the supply circuit of the electrical device, a linear impedance and a non-linear impedance connected in series with each other and in parallel with said tube and relay, the grid of the tube being connected to the linear impedance at a point intermediate its ends, and a second motor control circuit and means for controlling said circuit, said means comprising an electron discharge tube, relay, and impedances connected and related in the same manner as like parts of the voltage responsive means hereinabove defined as associated with the first control circuit.

5. In apparatus for controlling the voltage impressed on the load circuit of an electrical device supplied from an alternating current source, a transformer provided with means for varying its transformation ratio and connected to said source, means for actuating said ratio varying means, and means for controlling said actuating means, said control means comprising a circuit including the cathode and plate elements of a three element electron discharge tube and means rendering the grid circuit of said tube responsive to increase above a predetermined value of voltage impressed on the electrical device, said last mentioned means comprising a circuit embodying a non-linear impedance and a linear impedance series connected across said load circuit, the grid circuit embodying a portion of said last mentioned impedance.

6. In apparatus for controlling the voltage impressed on the load circuit of an electrical device supplied from an alternating current source, a transformer provided with means for varying its transformation ratio and connected to said source, means for actuating said ratio varying means, and means for controlling said actuating means, said control means comprising a circuit including the cathode and plate elements of a three element electron discharge tube and means rendering the grid circuit of said tube responsive to increase above a predetermined value of the current through the electrical device, said last mentioned means comprising a circuit embodying a non-linear impedance and a linear impedance, the grid circuit embodying a portion of said last mentioned impedance.

7. In apparatus for controlling the voltage impressed on the load circuit of an electrical device supplied from an alternating current source, a transformer provided with means for varying its transformation ratio and connected to said source, means for actuating said ratio varying means, and means for controlling said actuating means to increase or decrease the voltage impressed on the load circuit, the means for controlling the motion of said actuating means to cause an increase of the impressed voltage comprising a circuit including the cathode and plate elements of a three element gaseous electron discharge tube and means rendering the grid circuit of said tube responsive to decrease below a predetermined value of the voltage impressed on the electrical device and the means for controlling the motion of said actuating means to cause a decrease of the voltage impressed on the electrical device comprising a circuit including the cathode and plate elements of a three element gaseous electron discharge tube and means rendering the grid circuit of said tube responsive to increase above a predetermined value of the voltage impressed on the electrical device, each of said means rendering its associated grid voltage responsive including a linear and a non-linear series connected impedance with a grid connected intermediate the ends of each linear impedance.

8. In apparatus for controlling the voltage impressed on the load circuit of an electrical device supplied from an alternating current source, a transformer provided with means for varying its transformation ratio and connected to said source, means for acting said ratio varying means, and alternating current operated means for controlling said actuating means, said control means comprising a circuit including the cathode and plate elements of a three element electron discharge tube in series with a relay and connected across the output of said transformer; and means for rendering the grid circuit of said tube responsive to variation in an electrical condition in the load circuit.

9. In apparatus for controlling the voltage impressed on the load circuit of an electrical device supplied from an alternating current source, a transformer provided with means for varying its transformation ratio and connected to said source, means for actuating said ratio varying means, an alternating current operated means for controlling said actuating means, said control means comprising a circuit including the cathode and plate elements of a three element electron discharge tube in series with a relay and connected across the output of said transformer; and means for rendering the grid circuit of said tube responsive to variation in an electrical condition in the load circuit, said last mentioned means comprising a circuit embodying a non-linear impedance and a linear impedance series connected across the output of said transformer, the grid circuit embodying a portion of said last mentioned impedance.

10. In apparatus for controlling the voltage impressed on the load circuit of an electrical device supplied from an alternating current source, a transformer provided with means for varying its transformation ratio and connected to said source, means for actuating said ratio varying means, an alternating current operating means for controlling said actuating means, said control means comprising a circuit including the cathode and plate elements of a three element electron discharge tube in series with a relay and connected across said transformer; and means for rendering the circuit of said tube responsive to variation in the electrical condition in the load circuit, said last mentioned means comprising a circuit embodying a non-linear impedance and a linear impedance series connected across a source of potential which is proportional to the output of said transformer, the grid circuit embracing a portion of said linear impedance.

JAMES S. MALSBARY.

REFERENCES CITED

The following references are of record in the file of this patent:

UNITED STATES PATENTS

| Number | Name | Date |
|---|---|---|
| 1,939,443 | Geiselman | Dec. 12, 1933 |
| 1,948,372 | Fitzgerald | Feb. 20, 1934 |
| 1,955,322 | Brown | Apr. 17, 1934 |
| 2,071,984 | Minneci | Feb. 23, 1937 |
| 2,210,394 | Braden | Aug. 6, 1940 |
| 2,239,768 | Artzt | Apr. 29, 1941 |